United States Patent [19]

Winkler

[11] Patent Number: 5,147,671
[45] Date of Patent: Sep. 15, 1992

[54] COLLAGEN WRAPTED MEAT PRODUCTS

[75] Inventor: Bruno Winkler, Weinheim-Oberflockenbach, Fed. Rep. of Germany

[73] Assignee: Naturin-Werk Becker & Co., Weinheim/Bergstrasse, Fed. Rep. of Germany

[21] Appl. No.: 568,838

[22] Filed: Aug. 17, 1990

Related U.S. Application Data

[60] Division of Ser. No. 428,360, Oct. 27, 1989, Pat. No. 4,958,477, which is a division of Ser. No. 63,715, Jun. 15, 1987, Pat. No. 4,910,034, which is a continuation of Ser. No. 770,412, Aug. 28, 1985, abandoned.

[30] Foreign Application Priority Data

Aug. 28, 1984 [DE] Fed. Rep. of Germany ....... 3431521

[51] Int. Cl.⁵ .............................................. A23L 1/31
[52] U.S. Cl. ...................................... 426/140; 426/641
[58] Field of Search ............... 426/129, 140, 641, 645, 426/410, 415, 513, 413, 414

[56] References Cited

U.S. PATENT DOCUMENTS

| | | | |
|---|---|---|---|
| 2,247,312 | 6/1941 | Rumsey | 426/414 X |
| 2,368,398 | 1/1945 | Baker | 426/413 |
| 3,151,990 | 10/1964 | McKnight | 426/646 X |
| 3,178,910 | 4/1965 | Hammerle | 426/129 X |
| 3,248,905 | 5/1966 | Krauss et al. | 426/129 X |
| 3,664,849 | 5/1972 | Autry | 426/140 X |
| 3,732,113 | 5/1973 | Walters | 426/524 X |
| 3,897,567 | 7/1975 | Inklaar | 426/129 X |

FOREIGN PATENT DOCUMENTS 967501  8/1964  United Kingdom ................ 426/140

Primary Examiner—Arthur L. Corbin
Attorney, Agent, or Firm—Robert W. Becker & Associates

[57] ABSTRACT

A meat product of at least one individual chunk of meat cooked in a compact form in an outer mesh netting is provided. The meat product is simultaneously wrapped and covered with both a thin and fragile edible inner collagen film and the outer netting such that the edible inner collagen film is in surface contact with the meat product as a casing and as a separating medium to hinder adhesion of the outer netting to the meat product. The netting completely encloses both the meat product and the inner collagen film. The meat product is then heat treated by cooking it as well as the edible inner collagen film and the outer netting to avoid any problem of sticking of the netting to the meat product and preclude damage to the edible inner collagen film. The edible collagen film is insoluble in water so that the cooking makes it possible to provide a compact, ready-to-eat meat product with a flawless, intact outer surface. Finally, the outer netting is removed to obtain a visually pleasing meat product.

1 Claim, 6 Drawing Sheets

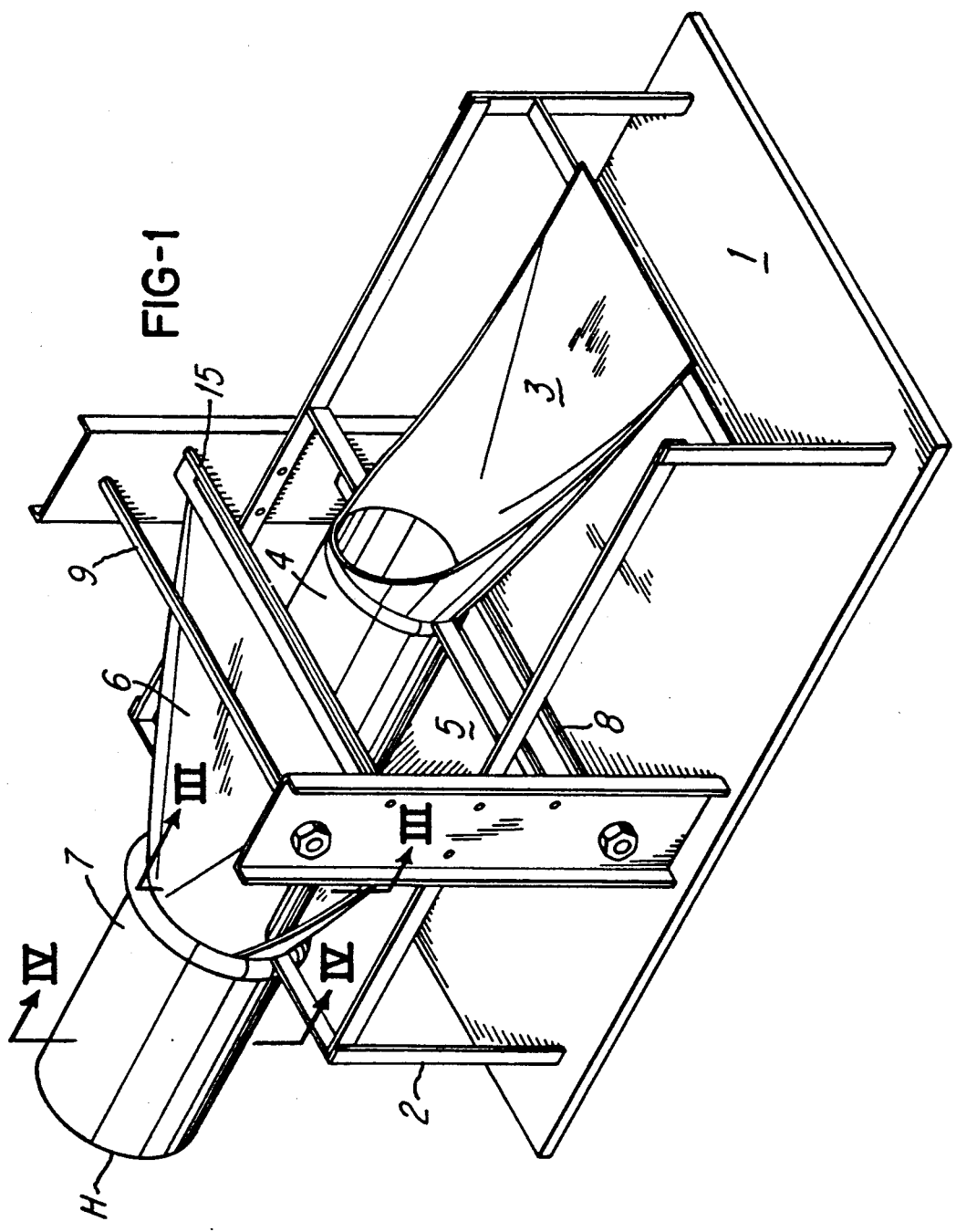

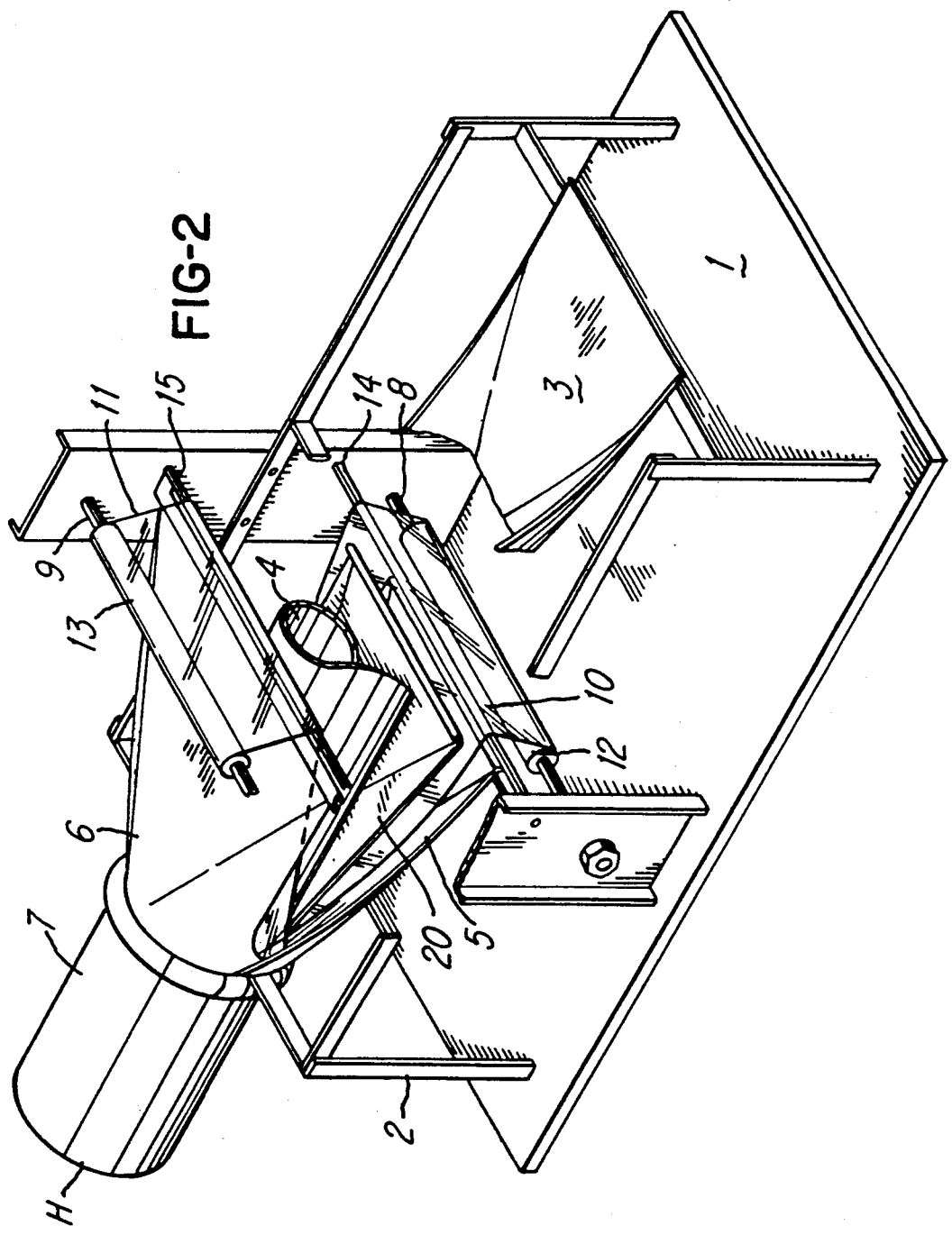

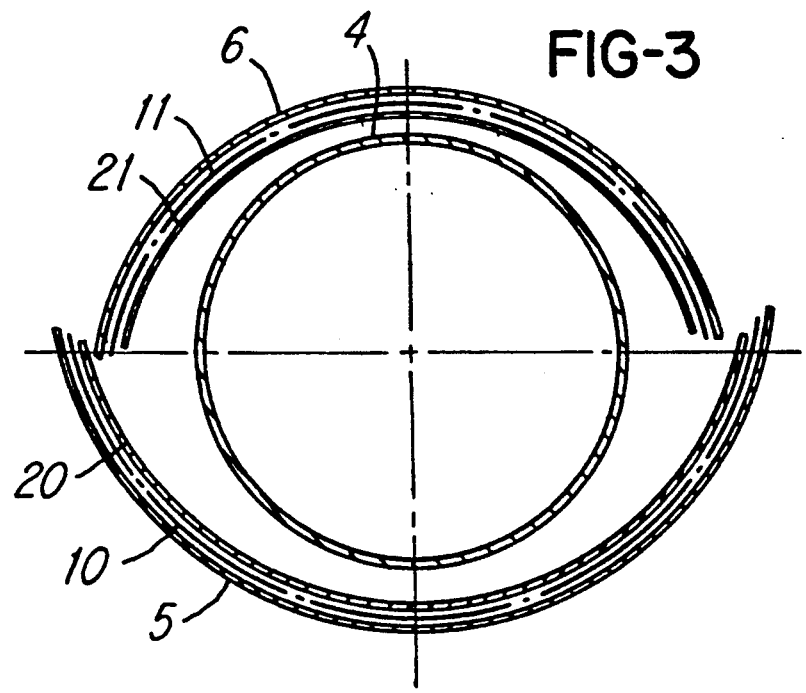
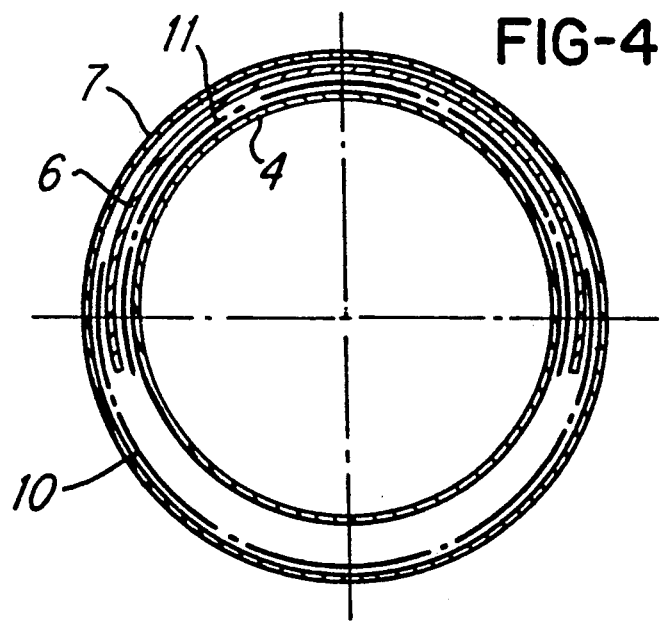

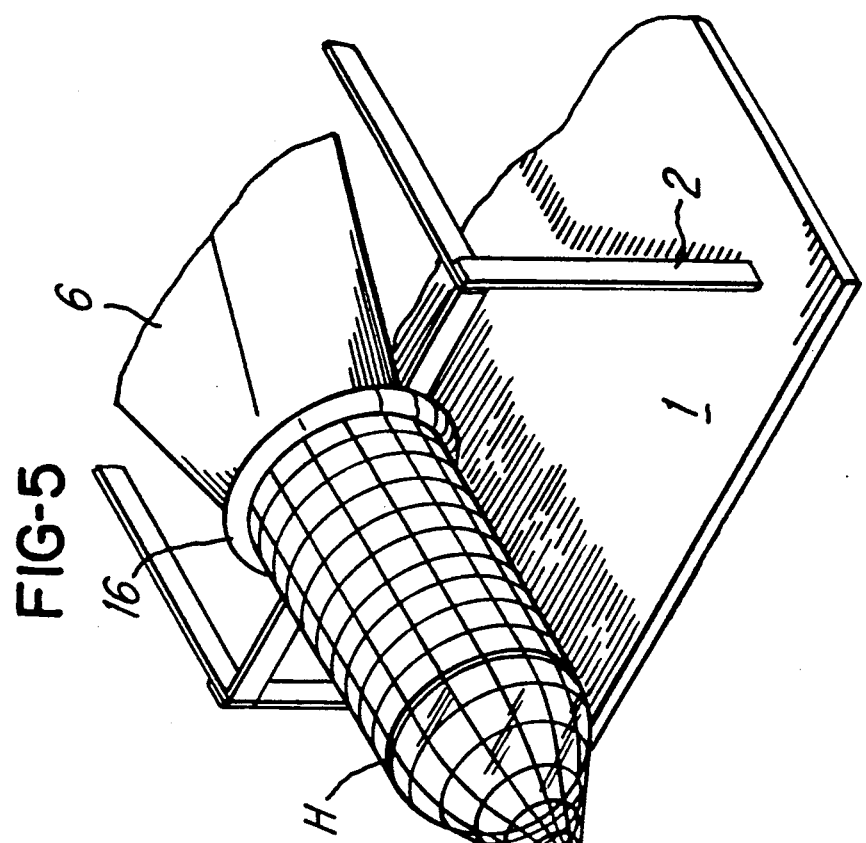
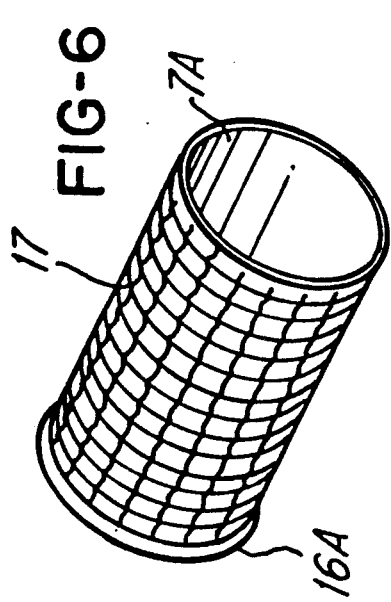

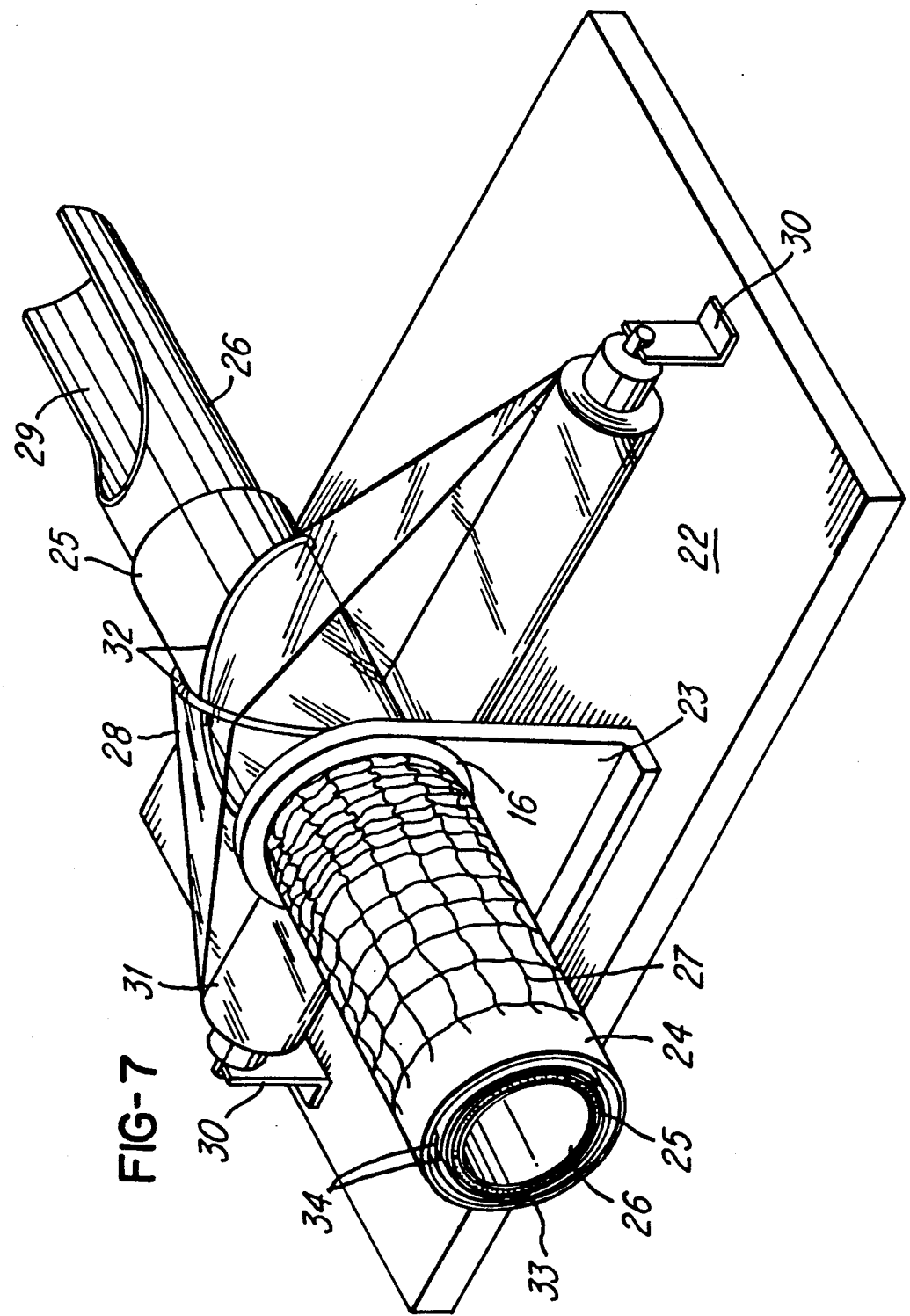

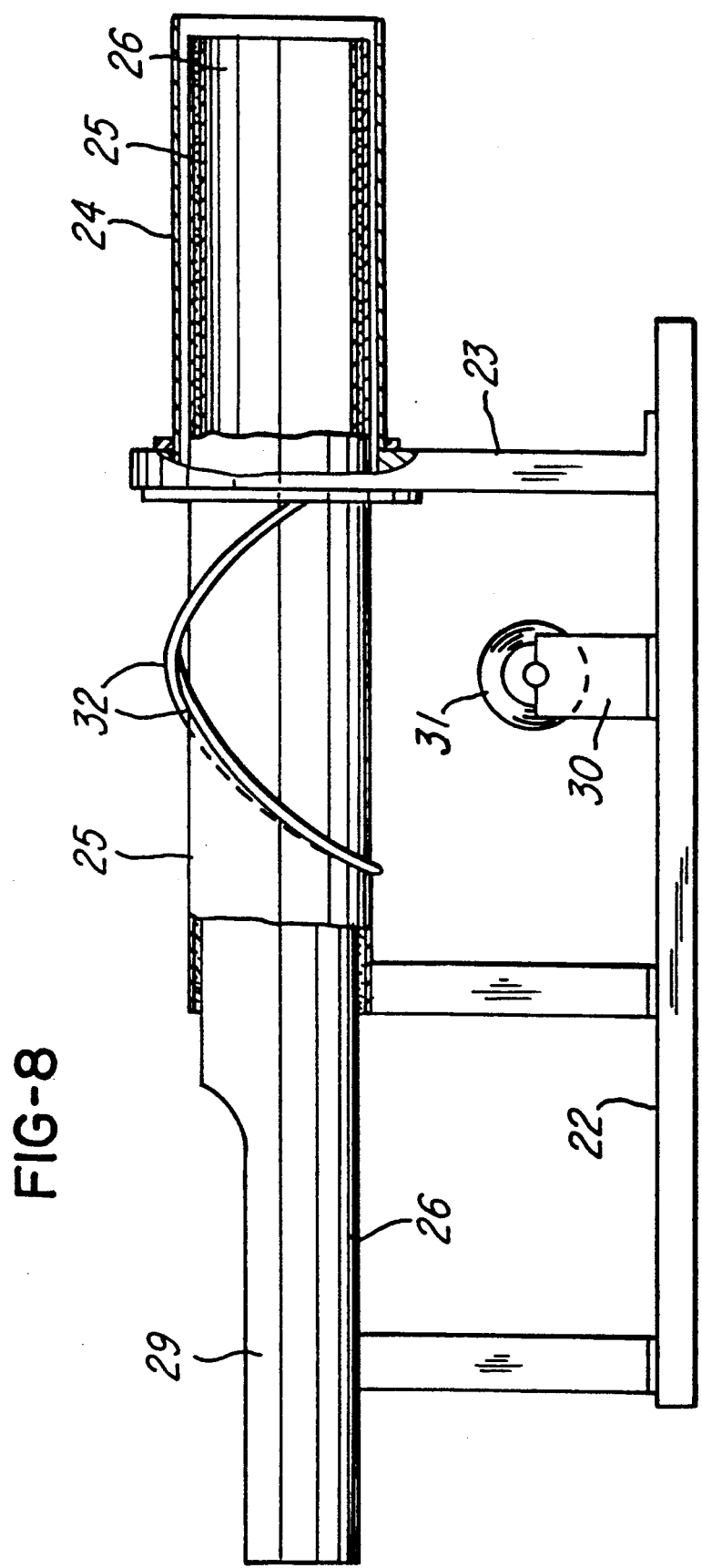

COLLAGEN WRAPPED MEAT PRODUCTS

This is a divisional application of U.S. Ser. No. 428,360 filed Oct. 27, 1989, now U.S. Pat. No. 4,958,477, which in turn was a divisional application of U.S. Ser. No. 063,715 filed Jun. 15, 1987, now U.S. Pat. No. 4,910,034, which was a continuation application of U.S Ser. No. 770,412, filed Aug. 28, 1985, now abandoned.

BACKGROUND OF THE INVENTION

The present invention relates to a process and apparatus for the production of meat products, such as cooked ham, and in particular to the meat product itself.

Cooked ham is a popular meat product, which is both mass-produced and hand-made. According to normal procedure, de-boned ham is cured, lightly smoked, and blanched at 70 to 75.

Due to the large demand for cooked ham, other large muscle parts of the pig are now being used, for instance, de-limbed shoulder or neck. If these fleshy parts are not to be pasteurized in tins, aluminum foil, or skins, they are, for the purpose of maintaining their compact form, cooked while tied up in string or netting (particularly plastic netting). This type of method and apparatus for the introduction of meat products into netting has been described, for example, in German Gebrauchsmuster 18 77 878 of Aug. 14, 1963 and German Offenlegungsschrift 22 29 917 dated May 30, 1973. Although the compacting of the meat product can be accomplished in the usual manner, this procedure suffers from a serious problem of unavoidable sticking together of netting and tissue during the processing of the raw or precooked meat. If the netting is removed—for instance, before the cutting of the ham contained therein—individual muscle fibers, and possibly also entire chunks of meat, remain suspended on the net, having been torn out of the ham. In some cases, this can render the product unfit for sale.

The object of the present invention is therefore to provide a means of production that would, on the one hand, allow such meat products to retain their compact shapes while being smoked and/or heated, and, on the other hand, ensure that the surface of the meat would remain intact during removal of the netting before sale. This problem has not been satisfactorily addressed by the prior art.

BRIEF DESCRIPTION OF THE DRAWINGS

This object, and other objects and advantages of the present invention, will appear more clearly from the following specification in conjunction with the accompanying drawings, in which:

FIG. 1 is a perspective view of the apparatus according to one embodiment of this invention;

FIG. 2 shows the same view as FIG. 1 while enhancing the path of movement of the film through the apparatus, for which purpose parts of the device indicated by broken lines have been omitted;

FIG. 3 shows a section through the device of FIG. 1, which is indicated in FIG. 1 by the section line III—III;

FIG. 4 shows a section through the device of FIG. 1, which is indicated in FIG. 1 by the section line IV—IV;

FIG. 5 shows a view of the rear end (H) of the device of FIG. 1 with a ham having been introduced into the netting;

FIG. 6 shows a net storage and dispensing sleeve for attachment to the device of FIG. 1;

FIG. 7 shows a further embodiment of the apparatus of this invention; and

FIG. 8 shows a lengthwise section through the apparatus of FIG. 7.

SUMMARY OF THE INVENTION

The present invention is characterized by the surprising discovery that the above problem may be solved by enveloping the raw or pre-processed meat pieces in a casing made from an edible collagen film and then covering this casing with a netting laid lengthwise or crosswise, and cooking the product in a subsequent processing stage. Quite unexpectedly, this edible collagen film, as opposed to the uncovered meat surface (which likewise consists of protein), does not stick to the netting during the smoking and/or cooking process. Following the envelopment of the meat surface by the collagen film and application of the shape-retaining netting, the actual processing of the product by smoking, heating, or other conventional methods takes place. This invention makes it possible to offer compact, ready-to-eat products with flawless, intact surfaces which, after the removal of the netting, are visually pleasing by the absence of damage or the appearance of an unappetizing, and recognizably non-meat casing.

Although the actual manner of application of the collagen film does not bear upon the result which is the object of this invention, since it is selected to be thin for sensory considerations, it can be damaged when the netting is pulled over it. Unexpectedly, it has been found that such damage may be eliminated by applying the collagen film and netting at the same time.

Advantageously, the product may be wrapped in a ready-made collagen membrane. A suitable natural collagen membrane is provided by the so-called "Goldbeater's Skin", which is fashioned from a cow's lower intestine. However, the employment of edible collagen films from modified natural collagen is preferable, because they are independent of the limited availability of slaughtered cattle, and are from the beginning hygienically produced in perfect condition and in practically any width. These are currently available in tubular or flat films. They are described for example in German Patent 642 922 and can be produced on a film casting machine, for example, according to German Patent 824 825-Lange dated May 30, 1973 and U.S. Pat. No. 2,747,228-Braun et al dated May 29, 1956.

Collagen films of this type are used in a of diverse areas. For instance, they are now used in medical technology, as described in U.S. Pat. No. 2,747,228-Braun et al dated May 29, 1956 and, according to U.S. Pat. No. 3,014,024-Lieberman et al dated Dec. 19, 1961, they are also used as an intermediate product in the production of surgical thread. In foodstuff technology, collagen films e.g. according to German Patent 19 45 527-Pichon et al dated Dec. 29, 1977 corresponding to Canadian Patent 932 113, are used to wrap food products or, according to U.S. Pat. No. 3,014,024-Lieberman et al dated Dec. 9, 1961, to wrap meat products. In order to adapt to the product in question, the collagen can be pretreated in various ways. In German Patents 17 67 13-Tsuzuki dated Apr. 20, 1972 corresponding to U.S. Pat. No. 3,529,530-Tsuzuki dated Sept. 22, 1970 and 19 60 935-Tsuzuki dated Mar. 19, 1981 corresponding to U.S. Pat. application Ser. No. 782,953-Tsuzuki filed Dec. 11, 1968, there is described an enzyme treatment which renders the collagen film soluble in hot water. Such a film is used to package portioned food products which are to be prepared in hot water. The unopened package is placed in hot water, wherein the film dissolves thus releasing the contents of the package. Described in U.S. Pat. No. 3,664,849-Autry dated May 23, 1972 is a moisture-tight film of enzyme-treated collagen for use in the production of meat snack products.

The employment of an edible collagen as a solution to the previously described problem of net-sticking in the case of compact, smoked and/or heated meat products such as cooked ham, breast of goose, etc. is not suggested by the prior art.

The point in time at which the collagen layer and netting are introduced into the production process depends on the type of meat product to be handled. Where the process according to the invention is employed, for example, in the production of cooked ham, the meat is covered with edible film after curing and is drawn into an elastic netting. In this manner, as has already been described, the sticking of the netting with the meat during cooking or smoking is prevented.

An edible collagen flat film suitable for the process according to the invention is made from the corium of cow skins. De-haired cowhide is cleaned of meat, fat, and connecting tissue by scraping. For the production of leather, the outer so-called "grain side" is separated in a uniform thickness of 2 to 4 mm according to requirements. The remaining inner part, the so-called "flesh part", consists of the actual subcutaneous connecting tissue, the corium. This is really a tight weave of collagen fibers, which can be as thick as 1 cm. Through chemical and mechanical pulping, the collagen fibers of the corium can be rendered to a pourable mass and mixed with softener(s) and cross-linking agent(s). It will be apparent that these and other available additives (colorants, lubricants, etc.) connected with the use of the film in the process according to the invention must be suitable for use with foodstuffs. The mass of collagen fibers is then transferred in a uniform thickness to a suitable conveyor belt, which travels through a drying tunnel, whereupon the collagen mass is dried to form a film.

In the case of meat pieces of non-uniform shapes, an especially advantageous method of carrying out the process according to the invention is that of wrapping two edible flat collagen films from opposite sides of the piece of meat about the latter in such a way that the films overlap one another along their edges. For the process according to the invention, films having a thickness of 8 m to 40 m, (preferably 10 m to 25 m) are advantageous. If, as desired above, the enveloping of the product is to take place by means of two flat films for most conventional compact meat products, the film width lies in the range of 12 cm to 65 cm, preferably in the range of 36 cm to 57 cm. Such films are normally delivered in rolls which are usually 30 m long.

The shape-maintaining elastic netting is advantageously applied in the form of a tube. Especially suitable to the process are continuous, seamless tubular nets which consist of elastic fibers running crosswise and non-elastic fibers running parallel to the tube axis. The average mesh width of the netting sufficient to maintain form and, at the same time, to provide minimum shielding against the necessary heat and/or smoke, lies in the range of 5 mm to 15 mm, and preferably 10 mm. The form of the mesh does not affect the process. The diameter required depends on the circumference of the pieces of meat to be wrapped, and should be such that the netting lies tightly against the collagen-wrapped meat.

A further object of the invention is to provide apparatus by means of which pieces of meat, especially cooked ham, can simultaneously be enveloped in a casing of edible collagen film and an overlying elastic net, in accordance with the preferred embodiment of the process described above.

Devices for the pulling-on of tubular nets alone can be found in the prior art. For example, Canadian Patent 873 755 teaches a device for the separation and pulling on of a length of elastic netting over a sleeve cylinder. In this case, the diameter of the sleeve is such that the elastic netting is stretched forcefully in the lateral direction, while in the longitudinal direction, as is the case with sausage skins, it is gathered up into a fraction of its length. In FIG. 5 of this patent, there is shown a sleeve having netting thereon, such as could be used in conjunction with the apparatus of this invention.

German Gebrauchsmuster 76 00 041 teaches a hand-operated device for the drawing of an elastic tubular net onto a filling tube. German Offenlegungsschrift 28 00 933 describes a packaging machine for meat, such machine having a cylinder into which the meat is introduced and an air-pressure powered piston which drives the meat into the netting which is drawn over the cylinder.

In none of the devices described in these references is it possible to introduce a film between the meat and the netting during the packaging process.

DESCRIPTION OF PREFERRED EMBODIMENTS

Referring now to the drawings in detail, FIG. 1 shows a feed tray 3 for introduction of the meat product into a guide tube 4. Above and below the guide tube are attached film guide sheets or plates 5 and 6, which taper conically toward the end H of the device, and which may be made, for example, of sheet metal or plastic. One of the guides 5 and 6 fits into a tube 7 which surrounds the guide tube 4 in its end region and the other film guide extends into tube 7 in the form of a partial cylindrical shell. Preferably, the lower film guide sheet 5 fits into the tube 7. Several meters of tube netting 17 can be pulled onto tube 7 for storage. For this purpose, rod shaped roll holders 8 and 9 for the film rolls 12 and 13 are situated above film guide sheet 6 and below film guide sheet 5 in the zone of their leading edges. Between the film rolls 12 and 13 and the leading edges of the film guide sheets 5 and 6 are situated (if need be) rotatable round bars 14 and 15, across which the lengths of film are drawn. Further, as indicated in FIG. 3, film separator sheets or plates 20 and 21 are located between the guide tube 4 and the film guide sheets 5 and 6 and parallel thereto, at a distance of 3 to 5 mm therefrom, and likewise rounded in profile, which prevents the formation of longitudinal folds during the drawing of the films or thin sheets 10 and 11. Ideally, the crest line of the partially cylindrical film guide sheet 6 which extends into the tube 7 is securely attached to the inner wall of the tube 7.

The assembly comprising the feed tray 3, guides 5 and 6, and tubes 4 and 7 is supported, together with the items 8, 9, 14 and 15, upon a frame 2 which is secured to a table top 1 by screws or bolts. In a conventional manner, the device can be complemented by attaching a clipping device for the gathering-up and closing of the netting 17.

Referring to FIGS. 5 and 6, it is also advantageous to provide a flange 16 which is secured to tube 7, and to which a netting 17, along with a storage and supply sleeve 7a having a flange 16a, may be removably secured—preferably by means of a bayonet fitting (not shown).

In order to prepare the device for the process according to the invention, the desired amount of tubular netting 17 is pulled onto the tube 7 and the roll holders 8 and 9 are loaded with film rolls 12 and 13. The films 10 and 11 are led about the bars 14 and 15, between the film guide sheets 5 and 6 and the separator sheets 20 and 21, and then between the tubes 4 and 7 through the device toward the end H.

The flat films 10 and 11 are, as illustrated by FIG. 4, separated in their regions of overlap inside tube 7 of the device by the film guide sheet 6, which in this region has the shape of a partial cylindrical shell.

The tubular netting 17 is pulled a hand's width from the tube 7 and gathered together with the ends of the film lengths 10 and 11 ex&ending from the tube and fastened by means of a clip (for example, a metal clip). Appropriate clipping devices are commercially available and are not illustrated.

In order to carry out the process, a piece of cured ham is placed upon the feed tray 3 and, by means of a plunger (not shown) is pushed through the guide tube 4 to the end H, without the meat coming into contact with the film. In this manner, the collagen-film remains dry and capable of sliding. At the end of the device, the ham meets the end of the tubular netting and the enclosed film lengths 10 and 11 which have been fastened together with a clip as described above. Pushed farther, the ham 19 becomes wrapped in the overlapping films 10 and 11, and the elastic tubular netting 17. The ham 19, which is now wrapped in the netting and the underlying collagen film, is pulled ahead of the device until its end facing the device is two hand-widths from the latter. Netting 17 and film lengths 10 and 11 are pulled together and closed with a clip 18 approximately midway between the end of the device and the end of the ham. Together with the film, the net is severed beside the clip 18 on the side of the ham 19, drawn tightly over the end of the ham 19, and closed with another clip. In this way, a loop for hanging can be clipped in. The piece of meat is thereby ready to be smoked and/or cooked in the cooking cabinet. After cutting through the net near the clip, the device is ready to receive the next ham.

In another embodiment of this invention for simultaneously wrapping pre-processed pieces of meat in a collagen film and an overlying elastic net, the film is pulled from a supply roll across a forming shoulder into the shape of a tube having loosely overlapping side edges, and is guided between the piece of meat and the externally situated tubular netting. By this method, the collagen film is applied to the meat product in a single sheet. In order to carry out this embodiment of the invention, a device according to FIGS. 7 and 8 is provided, in which the piece of meat and the tubular netting are kept separate from the now tubiform film by means of concentrically arranged tubes. Upon a base or work surface 22, a mounting 23 for the concentric tubes 24, 25 and 26, is bolted or screwed. The outer tube 24 extends from only one side of the mounting 23, is removably attached to the mounting 23 by means of a flange 16 and a bayonet closure, and can accommodate a supply of several meters of tubular netting 27. The inner tubes 25, 26 extend from both sides of the mounting 23 and, on the side of the mounting 23 from which only the two inner tubes 25, 26 extend, a forming shoulder 32 is located. This forming shoulder aids in the formation of a film tube from the sheet of film 28. Further, the inner tubes 25 and 26 form a double-walled tube combination, in order to hinder the coating of the inner sliding surface of the film 28, which could occur during the packaging of cold pieces of meat. The intermediate space between the tubes 25 and 26 is filled with PUR-foam for insulation. The tube 26 is cut back on one side so as to afford a feed tray 29 upon which the meat to be packed can be placed.

Upon the work surface 22 are also located two roll holders 30 which support a roll of film 31. The film 28 is pulled from the roll around a forming shoulder 32 and formed into a film tube 33, whose edges 34 loosely overlap one another. The film tube is guided through the annular channel between the tubes 24 and 25 to their outward ends, both of which project for some distance from the mounting 23.

The forming shoulder 32 consists ideally of a piece of non-rusting round steel bar of approximately 6 mm diameter, which is attached to the mounting 23 by its ends which are to the right and left of the tube 25, is self-supporting, and is bent around the tube 25 at a slight distance therefrom.

For the packaging of meat, the tubular netting 27 and the film 28 are pulled sufficiently far forward that they draw together and are closed with a clip. Then, a piece of meat is pushed with a ram from behind, through the tube 26 and into the tubular netting with the underlying film, whereby both the film and netting are driven with the piece of meat until the latter has left the tube, with the tube netting collapsing behind it. Then as in the case of the previously described device, the netting is closed with a clip, severed, and pulled tightly from the front to the back over the meat, and is closed behind the meat with a clip.

In a further embodiment, the transfer of the meat pieces through the guide tubes 4, 26 occurs mechanically. For this purpose, a suitable pneumatic cylinder with an actuating rod and plunger for pushing the pieces of meat is attached before the feed trays 3, 29 and is arranged coaxially with the guide tubes 4, 26. This pneumatic cylinder is operated by means of a conventional power source.

It is further useful to push the netting 17, which is located on a sleeve as shown in FIG. 6, together with the sleeve onto the tube 7 or 24. By a suitable method, for instance by means of a bayonet closure, the sleeve is fixed to the flange 16. Cylinders and similar mechanisms for the drawing of tube nettings are commercially available.

In a further embodiment of the invention, two clipping machines are rigidly installed one behind the other behind the device, which, in order to perform their function, are each swung in the path of the enclosed ham. The first device places the clip 18, while the second places the clip 19 at the rear of the ham. Between the two clipping devices, there is situated another device to separate the tube netting and film. The path of the ham is defined by sheet metal channels, which connect together these optional parts of the mechanism.

Obviously, there are modifications which can conceivably be made to the process and apparatus according to the present invention For instance, automatic control can be incorporated without deviating from the essence of the invention.

Furthermore, the present invention is, of course, in no way restricted to the specific disclosure of the specification and drawings, but also encompasses any modifications within the scope of the appended claims.

What I claim is:

1. A meat product including at least one individual chunk of meat heat treated in a compact form in an inner collagen form and an outer mesh netting; said product being prepared by a process comprising the steps of:

simultaneously wrapping and covering said meat with both a thin and fragile edible inner collagen film having a thickness in a range of from 8 μm to 40 μm and a width in a range of 12 cm to 65 cm and an outer netting such that said edible inner collagen film is in surface contact with the meat product as a casing and as a separating medium to hinder adhesion of the outer netting to said meat product, and said netting completely encloses both said meat product and said inner collagen film;

said outer netting having a mesh width in the range of from 5 mm to 15 mm with elastic fibers aligned in a lateral direction and non-elastic fibers aligned in an axial direction, said outer netting primarily having an object of holding together the meat product;

thereupon heat treating said meat as well as the edible inner collagen film and outer netting collectively to avoid any problem of sticking of the netting to the meat and preclude damage to said edible inner collagen film, said edible collagen film being insoluble in water so that said heat treating makes it possible to provide a compact, ready-to-eat meat product with flawless, intact outer surfacing; and finally removing the outer netting to obtain a visually pleasing meat product absent any damage thereto and to preclude any appearance of unappetizing meat portions.

* * * * *